J. W. WILSON,
Assignor, by mesne assignments, to A. WATSON & F. A. JACOBS.
Rotary Road-Scraper.
No. 9,150. Reissued April 13, 1880.
*Fig. 1,*
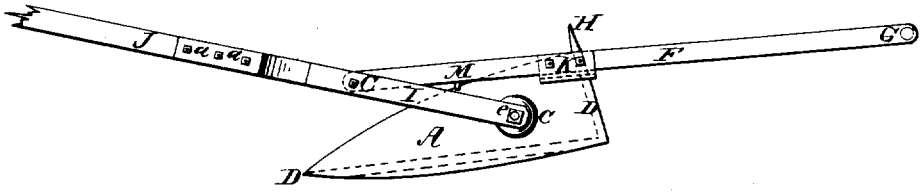
*Fig. 2,*
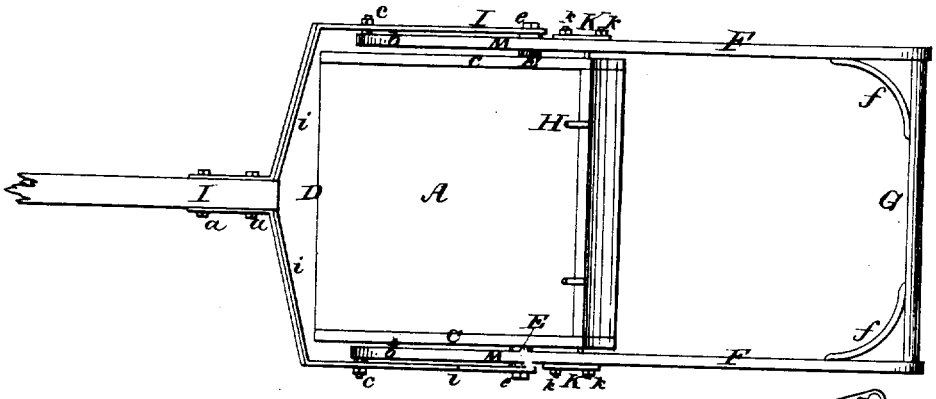
*Fig. 3,*
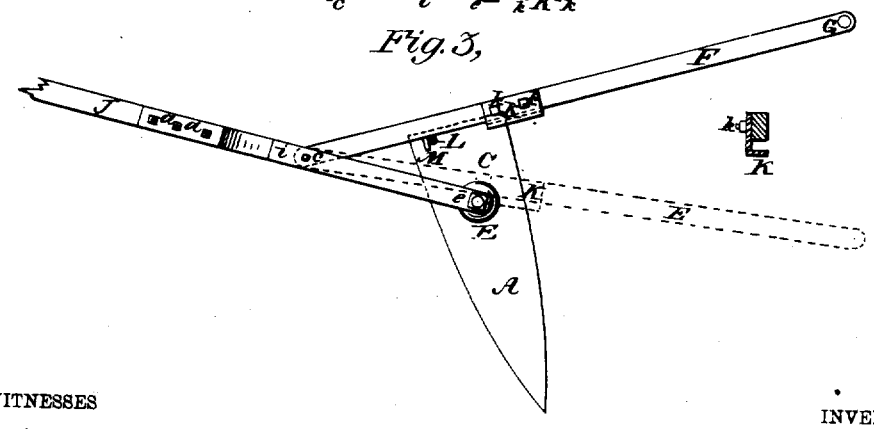
WITNESSES
Geo. Gill.
E. C. Fick
INVENTOR
Jacob W. Wilson,
by H. Bailey
his ATTORNEY.
N. PETERS, PHOTO-LITHOGRAPHER, WASHINGTON, D. C.

UNITED STATES PATENT OFFICE.

JACOB W. WILSON, OF SOMERFORD, ASSIGNOR, BY MESNE ASSIGNMENTS, TO ADDISON WATSON AND FELIX A. JACOBS, OF COLUMBUS, OHIO.

ROTARY ROAD-SCRAPER.

SPECIFICATION forming part of Reissued Letters Patent No. 9,150, dated April 13, 1880.

Original No. 88,686, dated April 6, 1869; Reissue No. 6,555, dated July 20, 1875. Application for reissue filed February 27, 1880.

*To all whom it may concern:*

Be it known that I, JACOB W. WILSON, of Somerford, in the county of Madison and State of Ohio, have invented certain new and useful Improvements in Revolving Road-Scrapers, of which the following is a specification.

My invention is directed to a novel construction and arrangement of the mechanism used in combination with the scoop or scraper proper for the purpose of operating the same.

Prior to my invention all road-scrapers employing a rotary or revolving scoop which while doing its work was locked fast in place in the machine, so as to be incapable of movement independently of the handles, were provided with locking devices whose disengagement for the purpose of liberating the scoop was uncontrolled and unaffected in any way by the handles, but which were operated to release said scoop by means of instrumentalities whose movement for the purpose of operating on the locking devices was independent of, and not induced or caused by, the movement of the handles.

It is my object to avoid the use of such independently-moving instrumentalities, and to bring about the disengagement of the locking devices by the movement of the handles themselves, enabling the operator to use the same handles by which he guides and controls the machine as the means also of effecting the unlocking of the scoop, and thus simplifying the machine and rendering it more simple and more easily and surely operated.

To this end I combine the yoke or bail-bars, the scoop, and the handles with locking devices—that is to say, devices which will hold the scoop against rotation in either direction—which are caused to disengage one another, so as to liberate the scoop, by upwardly tilting the handles.

One portion of the locking devices is carried by the handles and the other portion by the scoop, and they, in disengaging, move with respect to one another longitudinally, or in the direction of the length of the machine. They can readily be made capable of thus moving by pivoting the handles to the bail-bars at a point eccentric to that at which the bail-bars are pivoted to the scoop, as hereinafter described.

With the machine in which I have embodied my improvements I am enabled to regulate with ease the depth to which the scoop is to cut into the earth, to hold said scoop in proper position for transporting the earth scraped up, and by an upward movement of the handles to readily release the scoop, so that it may revolve to discharge its load and then get again into position for fresh work.

I also have provided my machine with means whereby, if it be desired to do so, the scoop can, after it has been unlocked and before it completes its revolution, be held in a suitable position for leveling down the earth after the latter may have been discharged or dumped from the scoop.

The nature of my invention and the manner in which the same is or may be carried into effect will be understood by reference to the accompanying drawings, in which—

Figure 1 is an elevation, and Fig. 2 is a plan, of a rotary road-scraper embodying my invention. Fig. 3 is an elevation of the same with the scoop in the position it occupies when used for leveling.

The scoop or scraper proper, A, is of ordinary form, being composed of a bottom, D, with sharp front edge, sides C C, and back B; but an ordinary cast-iron scraper may be used, if preferred. It is provided with the usual grabs or points H.

The scoop and the yoke or bail-bars I are pivoted together by pivot-bolts E, on which the bail-bars are held by nuts *e*, and to the yoke or bail-bars is fastened, by bolts *a*, a tongue, J, which serves as a means of attaching the team to the machine.

F F are the handles, connected at their rear ends by a cross-bar, G, and braced by braces *f*.

The scoop revolves on the centers E, and is held in working position by engaging or interlocking with the handles. To this end I employ locking devices, one portion of which is carried by the handles and the other portion by the scoop. The locking devices in this embodiment of my invention consist of irons K K, of an L-shaped cross-section, on the handles, and bolts or pins L on the scoop. The irons K are so arranged on the handles F as to leave a slot between the lower or horizontal arm of the L and the under face of the handle, as seen in detached cross-section on the right of Fig. 3.

The bolts or pins L, which project laterally one from each side of the scoop, are so placed or situated that when the scoop is in position for doing work as a scraper they will lie in the slots between the irons K and the handles, as indicated in Figs. 1 and 2.

It has been, as before stated, my purpose to so arrange the parts that the pins L can be disengaged from the irons K by means of the movement of the handles. To this end it is necessary, of course, that the part of the locking devices carried by the handles should be acted on by some portion of the machine eccentric to the axis of revolution of the scoop, in order that when the handles are lifted there may be a longitudinal movement of the two parts K and L on or with respect to one another sufficient to cause them to become disengaged. This I accomplish by pivoting the handles to the yoke or bail-bars at a point, *c*, eccentric to that point, E, at which the bail-bars and scoop are pivoted together. Under this arrangement it will be noted that when the handles are lifted they will also lift the rear of the scoop; but, inasmuch as the scoop and handles turn on different centers, the irons K move in a circle eccentric to that in which the pins L move, and consequently the two will, when the handles are lifted far enough, be disengaged, so as to liberate the scoop.

To prevent rubbing or wear between the handles and the bail-bars, washers *b* are placed on the pivot-bolts *c*, between the handles and the bail-bars. The pivots *c* are shown in the drawings as in advance of the pivots E.

When the scraper is being drawn to the place where it is to do work the sharp front edge of the scoop can be raised or tilted up sufficiently to clear the ground by pressing down on the handles F. As soon as the machine is required to do work as a scraper the handles are brought to position to permit the front of the scoop to dip into the earth as the machine is drawn forward by the team, the dip of the scoop while it is gathering its load being easily regulated through the instrumentality of the handles. When the scraper is loaded the handles F are pressed down, as before described, and the load is then drawn to any desired place.

To unload the scraper the handles F are lifted far enough to cause the disengagement of the locking devices, this being facilitated by the front of the scoop catching in the ground. The liberated scoop turns on its axis, discharges its load, and through the instrumentality of the grabs or points H, which stick in the ground, is caused to complete its revolution as the team moves forward, thus returning to its original position, and the handles having in the meantime been lowered, the pins L re-engage the irons K, and the scoop is thus again locked in position ready for work.

In order to render the scoop available for the purpose of leveling off the load discharged therefrom I provide the handles with stop-pins M, inserted in their lower faces, as shown in Figs. 1 and 3. These pins, which project but a short distance from the handles, are so placed that when the liberated scoop has made about a quarter-revolution the pins L will, if the handles are lowered sufficiently, come against said stop-pins, and so hold the scoop in the upright position shown in Fig. 3, in which position it can be used to level off the heap of earth discharged from it.

After the leveling-off operation is finished the operator raises the handles until the pins L clear the stop-pins, and the scoop then completes its revolution and returns to its original position.

It will, however, be readily seen that if it is not desired to have the scraper act to level off its discharged load the scoop can make its complete revolution without check or impediment by lifting the handles high enough in the first instance to permit the parts L M to clear one another.

Having described my improvements, what I claim, and desire to secure by Letters Patent, is—

1. In a revolving road-scraper, the combination, substantially as hereinbefore set forth, of the bail-bars, the handles, the scoop, and the devices for locking the scoop to the handles, carried the one part by the handles and the other part by the scoop, and operated to disengage from one another, so as to unlock the scoop from the handles by upwardly tilting said handles.

2. In a revolving road-scraper, the combination, with the scoop and bail-bars pivoted thereto, of handles pivoted eccentrically to the bail-bars, and devices for locking the scoop to the handles, carried the one part by the handles and the other part by the scoop, which are caused to disengage from one another, and thus liberate the scoop by an upward movement of the handles, substantially as set forth.

3. The combination, in a revolving scraper, of handles pivoted to the tongue-pieces or yoke in advance of the pivots of the scraper and connecting devices on the scraper and the handles arranged to disconnect and connect automatically, substantially as specified.

4. The peculiar arrangement and combination of the scraper A, standards E E, tongue pieces I I, and handles F F, the several parts being arranged substantially in the manner and for the purpose specified.

5. The L-shaped irons K K, when used in combination with the handles F F and the pins L L on the scraper A, substantially as and for the purposes specified.

6. The pins M M, when used in combination with the handles F F, pivoted to the tongue-pieces I I and pins L L, and the scraper A, substantially as and for the purpose herein specified.

7. The peculiar arrangement and combination of the scraper A, with the standards E E and pins L L, the tongue-pieces I I, and handles F F, with pins M M and L-shaped irons K K, the several parts being arranged substantially in the manner and for the purpose herein specified.

8. The rotary road-scraper herein described, composed, essentially, of the scraper A, with standards E E, pins L L, and spikes H H, screwed thereto, the tongue-pieces I I, with tongue J, the pivot-bolts *c c*, with separating washers *b b*, handles F F, with pins M M and L-shaped irons K K, and cross-bar G, with braces *f f*, the several parts being constructed and arranged substantially in the manner and for the purposes herein specified.

In testimony whereof I have hereunto set my hand this 14th day of January, A. D. 1880.

JACOB W. WILSON.

Witnesses:
GEO. N. WILSON,
S. W. DURFLINGER.